Oct. 24, 1933.                P. MacGAHAN                1,932,043
                                LIGHT METER
                              Filed Feb. 6, 1932
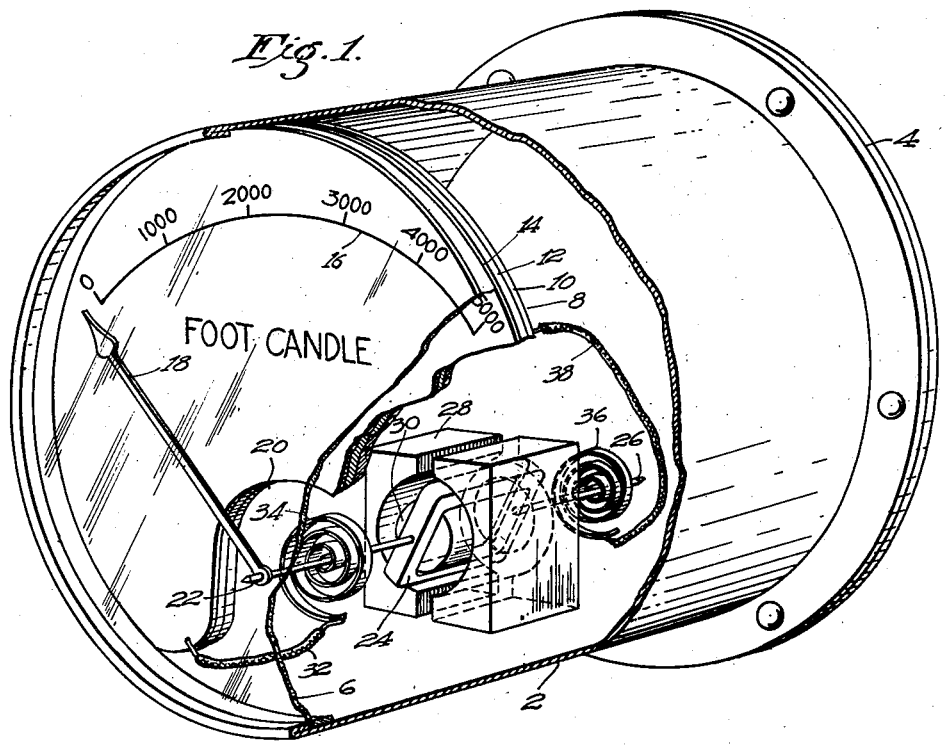
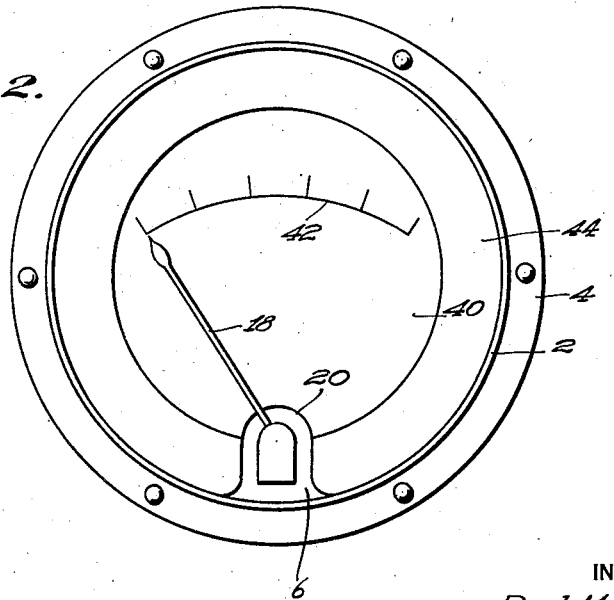
WITNESSES:-
INVENTOR
Paul MacGahan.
BY
ATTORNEY Patented Oct. 24, 1933

1,932,043

UNITED STATES PATENT OFFICE 1,932,043

LIGHT METER

Paul MacGahan, Orange, N. J., assignor to Westinghouse Electric & Manufacturing Company, a corporation of Pennsylvania Application February 6, 1932. Serial No. 591,440

3 Claims. (Cl. 88—23)

My invention relates to meters for measuring light and particularly to meters embodying means responsive to light for producing an electromotive force.

One object of my invention is to provide a device of the above-indicated character that shall constitute a self-contained unit, in contradistinction to devices heretofore employed embodying several separate parts.

Another object of my invention is to combine, substantially as a single entity, a dial and a light-sensitive element, in a manner whereby the light-sensitive element itself constitutes the dial or a composite wall or surface of a light-meter structure.

A further object of my invention is to provide a device of the above-indicated character that shall be simple and durable in construction, economical to manufacture and effective in its operation.

Heretofore, devices which, when subject to the influence of light, produce electromotive force have always, to the best of my knowledge, been employed as separate entities from the devices for which the force is produced.

In other words, a unit has been employed for producing an electromotive force and another unit, for utilizing the force and constituting a separate entity, has been connected thereto by conducting leads.

In one aspect, my invention contemplates the use of the whole light-sensitive surface of the force-producing unit as a reference dial but this feature may be modified within the purview of the invention, by having only a portion of the dial surface sensitive to light, or by having the light-sensitive surface in such relation to the dial, or as part of the unit support or casing, as to accomplish my purpose.

The resultant structure is such that it may be transported and employed as one unit, without the electrical connections or leads heretofore required.

Figure 1 of the accompanying drawing is a composite view of a meter embodying my invention, in which the electrical actuating mechanism is shown in exploded perspective, the casing and dial parts are shown in distorted perspective to fit the exploded parts, and certain of the electrical connections are shown diagrammatically, and Fig. 2 is a front view in elevation of a modified form of the invention.

Referring to Fig. 1, the device comprises a casing including a cylindrical side wall 2, a rear wall 4 and a front wall including a plate 6 of glass or other transparent or translucent material, and a light sensitive element 8.

The element 8 comprises any of several representative constituent parts, such as layers 10, 12 and 14 of iron, iron selenide and silver, respectively, which, when the layer 14 is subject to varying degrees of light, produce a corresponding difference of electrical potential between the layers 10 and 14. The specific construction and operation of this feature constitute no part of my invention, except insofar as the element 8 is employed as the dial of a meter in direct co-operation with a pointer, or as otherwise set forth, and further explanation thereof is deemed unnecessary.

My invention resides, in Fig. 1, in constructing the element 8 as a dial having a scale 16 thereon for cooperation with a pointer 18, the dial and glass plate 6 being suitably mounted as in a usual commercial instrument of the d'Arsonval type.

The element or dial 8 is provided with an opening 20 for a shaft 22 on which the pointer or index 18 is mounted.

The shaft 22, a field coil 24 and a shaft 26 constitute, with the pointer 18, the movable system of the meter in which field-magnet elements 28 and 30, of usual types, constitute the stationary parts.

A conducting lead 32 is connected from the layer 14, through a spiral spring 34 to the coil or winding 24, the circuit of the latter being completed through a spiral spring 36 and a lead 38 to the layer 10.

In operation, when the layer 14 is exposed to light an electromotive force is produced between the layers 14 and 10 in accordance with the light intensity. This electromotive force, imposed on the coil 24 in opposition to the magnetic force of the stationary field, causes the pointer to move accordingly, and in proportion to the intensity of the light being measured.

The scale may be graduated in foot candles, as shown, or in lumens, seconds or other units. Marking the scale in seconds may be preferable, where the device is employed in conjunction with a camera to determine the correct exposure time for a photographic film or plate.

As shown in Fig. 2, instead of having the scale marked directly on the sensitive layer, as in Fig. 1, an ordinary meter dial 40 having a scale 42 thereon is surrounded by a sensitive surface 44 corresponding to the layer 14 of Fig. 1.

By my invention, a simple, compact, self-contained unit is obtained which may be readily adapted for many purposes, such as a watch-size pocket instrument, a larger unit for specific applications, a portion of a pen and pencil desk set for indicating when an office should be further illuminated, and in other obvious applications.

While I have shown and described particular forms of my invention, changes may be effected therein without departing from the spirit and scope thereof, as set forth in the appended claims.

I claim as my invention:

1. A self-contained illumination measuring instrument comprising an open-ended casing, a sensitive electrical instrument movement of the d'Arsonval type mounted within said casing, an indicating pointer for said movement disposed to swing across the open end of said casing, a photo-sensitive cell of the dry disc type disposed behind said pointer and substantially closing the casing, electrical connections between said cell and said instrument movement, and a calibrated scale carried directly by said cell for cooperation with said pointer.

2. A self-contained illumination measuring instrument comprising an open-ended casing, a sensitive electrical instrument movement of the d'Arsonval type mounted within said casing, an indicating pointer for said movement disposed to swing across the open end of said casing, a photo-sensitive cell of the dry disc type disposed behind said pointer and substantially closing the casing, electrical connections between said cell and said instrument movement, and a calibrated scale marked directly on said cell for cooperation with said pointer.

3. A self-contained illumination measuring instrument comprising an open-ended casing, a sensitive electrical instrument movement of the d'Arsonval type mounted within said casing, an indicating pointer for said movement disposed to swing across the open end of said casing, a photo-sensitive cell of the dry disc type disposed behind said pointer and substantially closing the casing, electrical connections between said cell and said instrument movement, a calibrated scale marked directly on said cell for cooperation with said pointer, and a transparent cover overlying said pointer and cell.

PAUL MacGAHAN.